United States Patent [19]

Sugishima

[11] Patent Number: 5,162,917
[45] Date of Patent: Nov. 10, 1992

[54] IMAGE DATA COMMUNICATION CONTROL SYSTEM WITH IMAGE RECORDER STATUS DATA OUTPUT IN SYNCHRONISM WITH EITHER INTERNALLY OR EXTERNALLY GENERATED CLOCK PULSES

[75] Inventor: Kiyohisa Sugishima, Tokyo, Japan

[73] Assignee: Canon Kabushiki Kaisha, Tokyo, Japan

[21] Appl. No.: 803,228

[22] Filed: Dec. 6, 1991

Related U.S. Application Data

[60] Division of Ser. No. 554,187, Jul. 20, 1990, which is a continuation of Ser. No. 291,349, Dec. 29, 1988, which is a continuation of Ser. No. 41,635, Apr. 23, 1987, which is a continuation of Ser. No. 594,866, Mar. 29, 1984, abandoned.

[30] Foreign Application Priority Data

Apr. 2, 1983 [JP] Japan .................................. 58-56828

[51] Int. Cl.$^5$ ........................ H04N 1/32; H04N 1/36; H04N 1/23
[52] U.S. Cl. .................................... 358/296; 358/409; 358/434; 358/439; 358/442
[58] Field of Search ............... 358/296, 406, 409, 434, 358/435, 438, 439, 436, 442; 364/919, 919.1, 932; 395/550

[56] References Cited

U.S. PATENT DOCUMENTS 4,671,294 9/1987 Humpleman ...................... 364/919

Primary Examiner—Benjamin R. Fuller
Assistant Examiner—Scott A. Rogers
Attorney, Agent, or Firm—Fitzpatrick, Cella, Harper & Scinto

[57] ABSTRACT

An image data communication system for controlling an image reader and an image recorder has an optical system for reading an image, a signal processor for processing the read image, microprocessors for controlling image reading and image data communication, and serial circuits for supplying control data. The system allows connection of image readers and image recorders of different types.

The system also provides modes for transmitting status data from the image recorder in synchronism with either internally or externally generated clock pulses when the status data is requested by an external command or when an error occurs in an image recording operation.

7 Claims, 15 Drawing Sheets

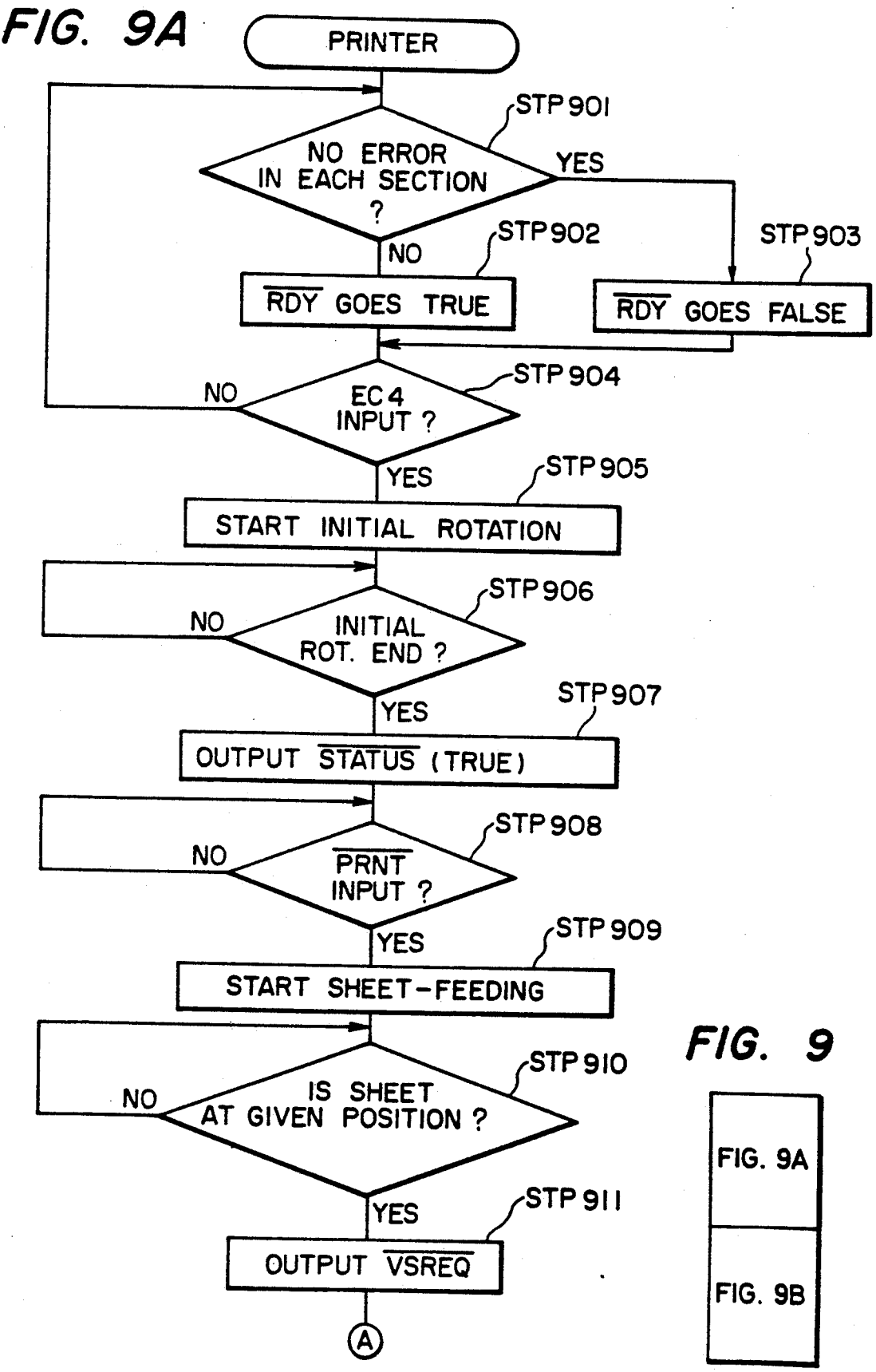
FIG. 9A
FIG. 9
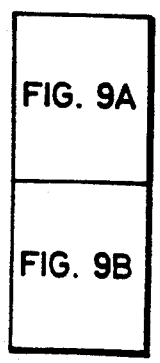

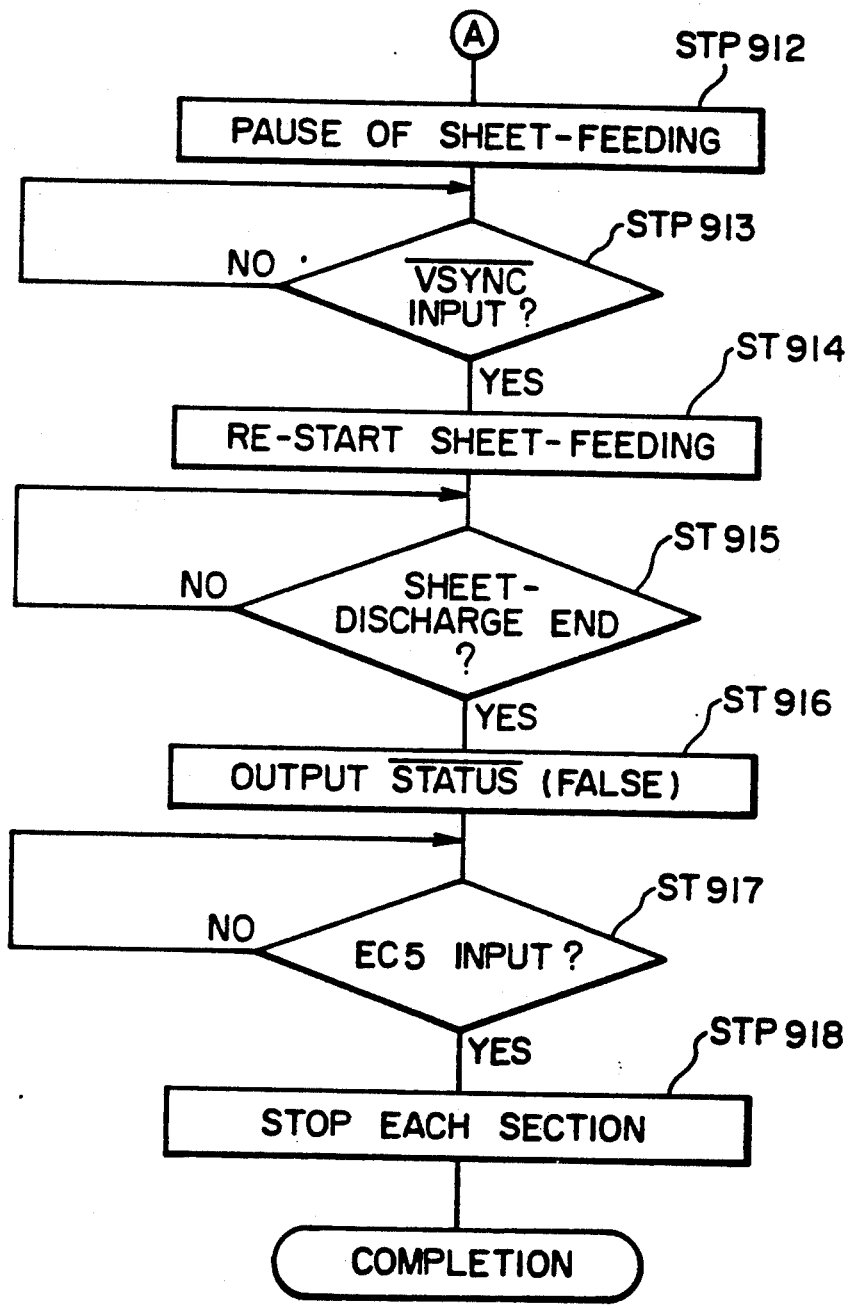

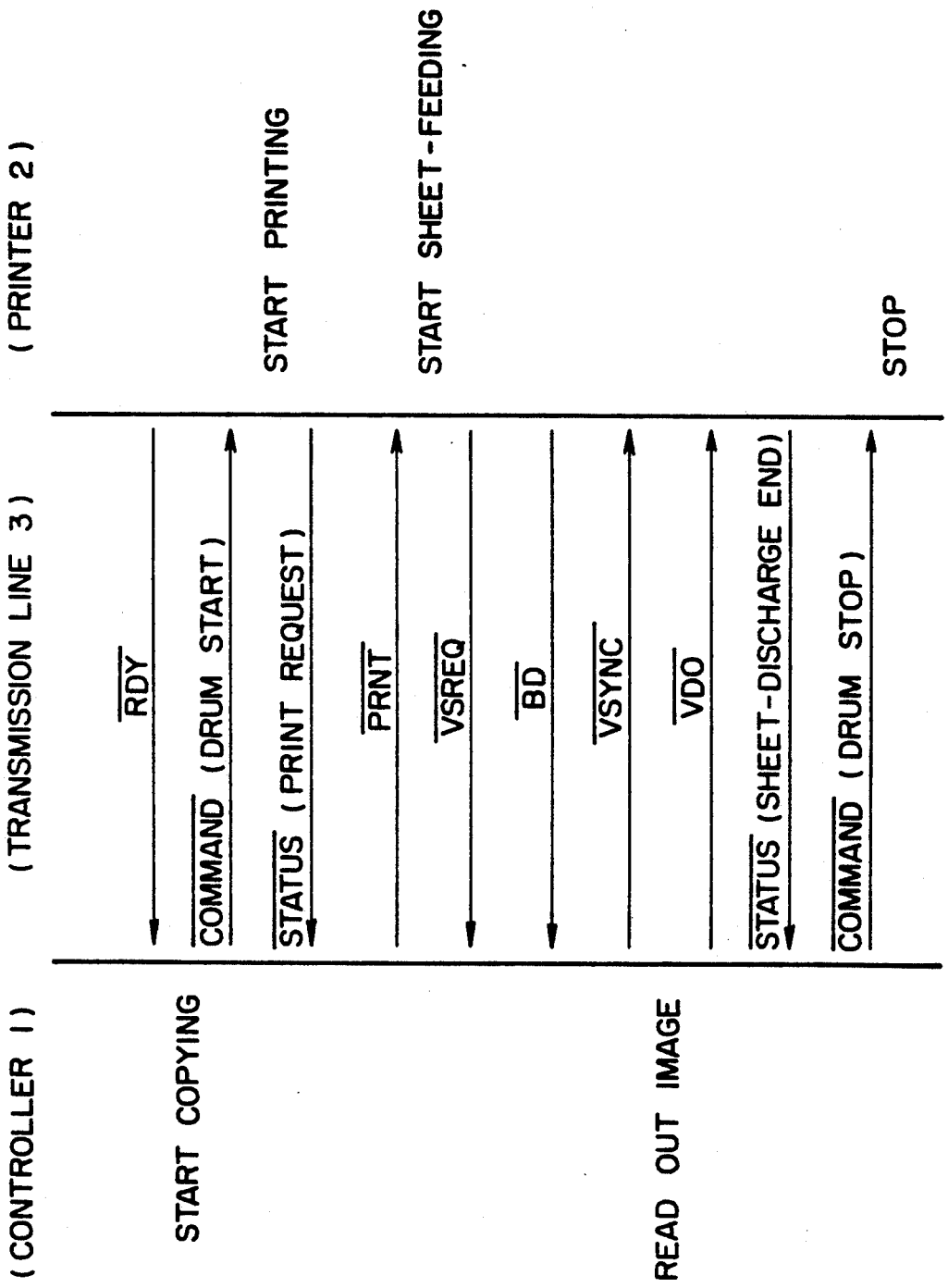

IMAGE DATA COMMUNICATION CONTROL SYSTEM WITH IMAGE RECORDER STATUS DATA OUTPUT IN SYNCHRONISM WITH EITHER INTERNALLY OR EXTERNALLY GENERATED CLOCK PULSES

This application is a division of application Ser. No. 07/554,187 filed Jul. 20, 1990, which is a continuation of application Ser. No. 07/291,349 filed Dec, 29, 1988, which is a continuation of application Ser. No. 41,635 filed Apr. 23, 1987, which is a continuation of application Ser. No. 594,866 filed Mar. 29, 1984.

BACKGROUND OF THE INVENTION

1. Field of the Invention

The present invention relates to an image data communication control system for controlling an image data transmitter for transmitting image data and an image data receiver for receiving the transmitted image data and performing an image output processing such as image recording.

2. Description of the Prior Art

Developments are being made in electronic OA equipment such as image readers and word processors, electrophotographic copying machines or printers such as laser beam printers as output devices for computers and the like, display devices such as CRT displays, and electronic file devices such as floppy devices. However, image data transmitters such as image readers and image data receivers such as laser beam printers adopt different image data communication control systems depending on the type of such transmitters or receivers and the like. When the control systems are different, control and response data are also different. In view of this, image data are conventionally transmitted in parallel through different channels for different control and response data. This does not allow a connection between image data transmitters and receivers of different types for the purpose of image data communication therebetween.

SUMMARY OF THE INVENTION

It is an object of the present invention to provide a solution to the above-mentioned problems.

It is another object of the present invention to provide a general-purpose image data communication control system which can be used for devices of many different types.

It is still another object of the present invention to provide an image data communication control system which allows standardization for connection of different devices.

It is still another object of the present invention to provide an image data communication control system which can perform image data communication in accordance with a relatively simple configuration and control sequence.

It is still another object of the present invention to provide an image data communication control system which is capable of high-speed image data transmission.

The above and other objects and features of the present invention will become apparent from the following description and the appended claims when taken in conjunction with the accompanying drawings.

BRIEF DESCRIPTION OF THE DRAWINGS

FIG. 9 is a flow chart showing the operation of the image recorder shown in FIG. 3; and FIG. 10 is a representation showing the sequence of signal generation when the flow charts shown in FIGS. 8 and 9 are executed.

DETAILED DESCRIPTION OF THE PREFERRED EMBODIMENTS

Figure 1:
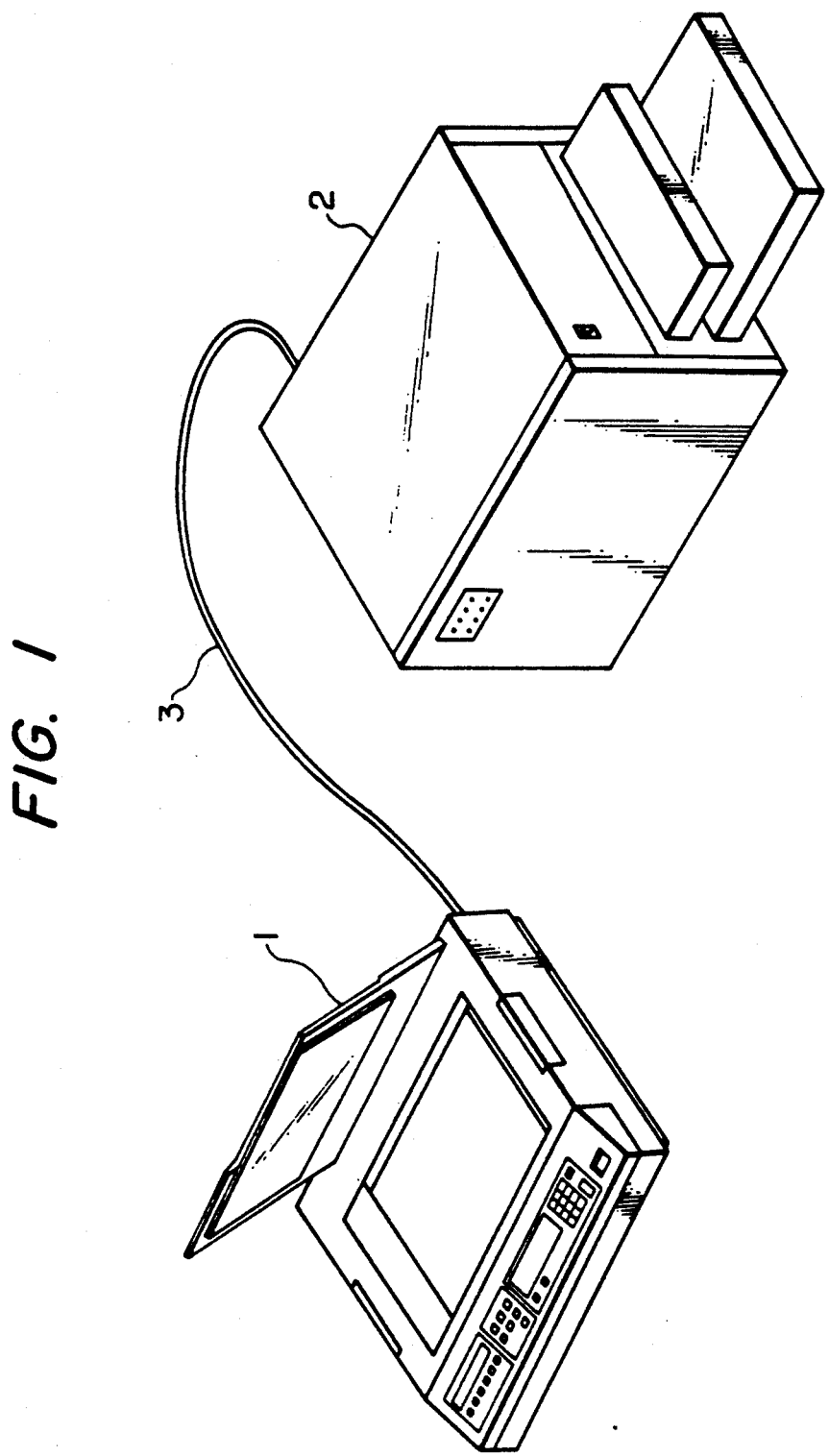
FIG. 1 is a perspective view showing an example of a combination of an image reader and an image recorder to which the present invention can be applied.

FIG. 1 shows an example of an image reader 1 and an image recorder 2 to which an image data communication control system of the present invention is applied. The image reader 1 and the image recorder 2 are connected through a transmission cable 3. Image data of an original read by the image reader 1 is transmitted to the image recorder 2 through the transmission cable 3 and is reproduced on a recording paper sheet (not shown). Various other signals such as control data or response data signals for controlling the image reproduction are also transmitted through the transmission cable 3.

Figure 2:
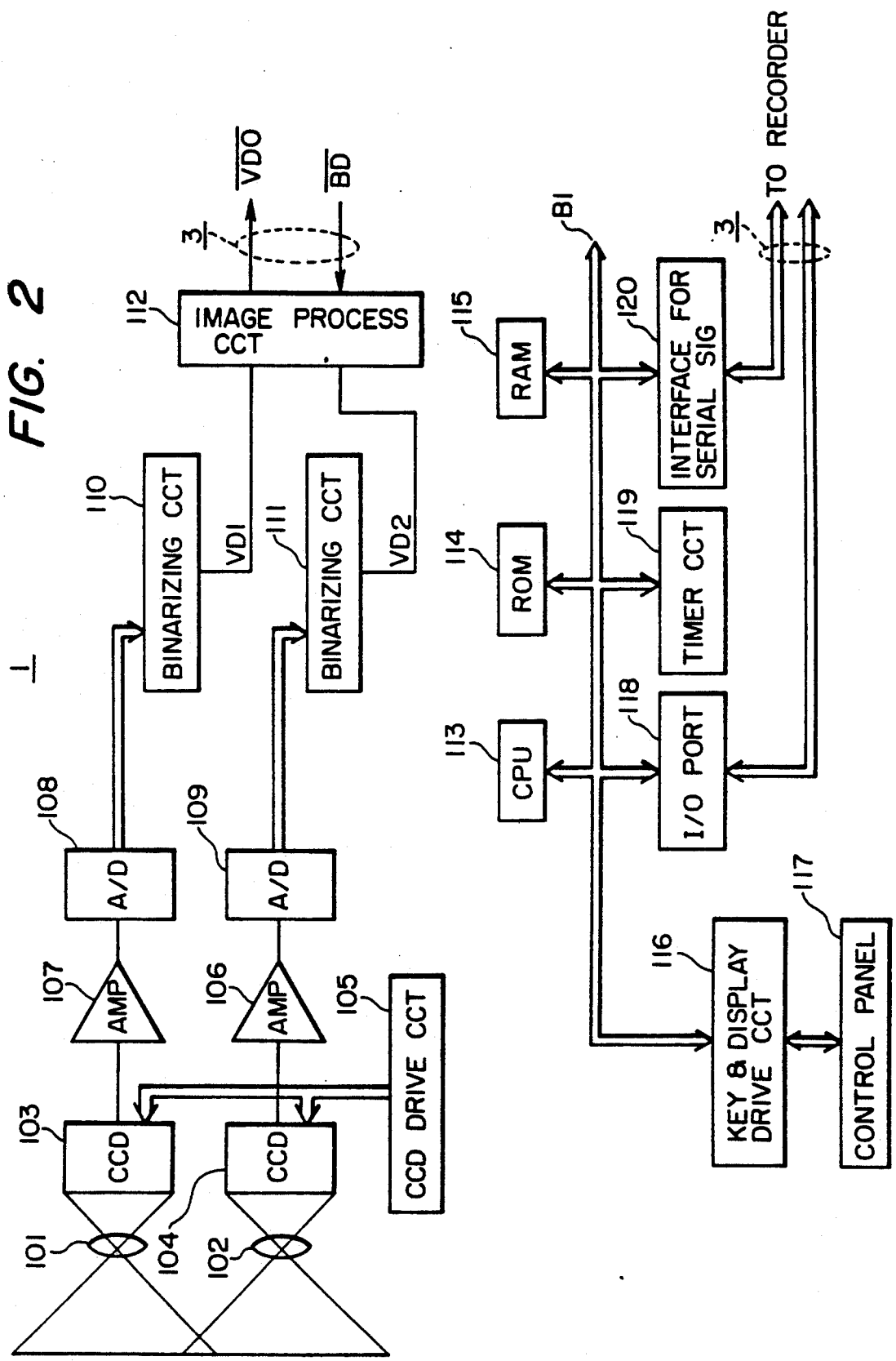
FIG. 2 is a block diagram showing an example of the configuration of the image reader shown in FIG. 1.

FIG. 2 shows an example of the configuration of the image reader 1 shown in FIG. 1. Referring to FIG. 2, light from an original placed on an original table (not shown) is focused through optical lenses 101 and 102 on CCDs 103 and 104 driven by a CCD drive circuit 105. Outputs from the CCDs 103 and 104 are supplied to amplifiers 107 and 106, respectively, to be amplified. Simultaneously, the original and the optical system are moved relative to each other to sequentially scan the original. Detailed description on such scan means is omitted as being well known to those people in the art.

The amplified image signals from the amplifiers 107 and 106 are supplied to A/D converters 108 and 109 and are converted into multi-valued digital image signals. The signals from the A/D converters 108 and 109 are supplied to binarizing circuits 110 and 111. Binary digital image signals VD1 and VD2 from the binarizing circuits 110 and 111 are supplied to an image processing circuit 112. In synchronism with a horizontal sync signal $\overline{BD}$ to be described later, the image processing circuit 112 transmits to the image recorder 2 a serial image signal $\overline{VDO}$ corresponding to the input digital image signals. The horizontal sync signal $\overline{BD}$ is supplied from the image recorder 2 and is used as a timing signal.

A CPU 113 performs various arithmetic operations and logical discriminations for image reading or image data transmission. The CPU 113 comprises a microcomputer which controls the various elements connected to a bus B1 therethrough. A control memory (ROM) 114 stores a control program for the CPU 113. A rewritable random-access memory (RAM) 115 for temporarily storing various data from the respective elements can be used as a work memory for the arithmetic operations and logical discriminations of the CPU 113. A key display driving circuit 116 scans the key matrix of a controller (control panel) 117 and drives the display. An I/O port 118 is connected to an interface and drive circuit (both not shown) and is partially used for communication between the image reader and the image recorder. An interface for serial signal 120 supplies a control command to the image recorder 2 and performs communication processing to allow reception of response data. The CPU 113 operates in accordance with the control sequence of the program stored in the ROM 114 and uses the RAM 115, the I/O port 118, a timer circuit 119, the interface for serial signal, the key display driving circuit 116, and the like, to perform control of overall image transmission.

Figure 3:
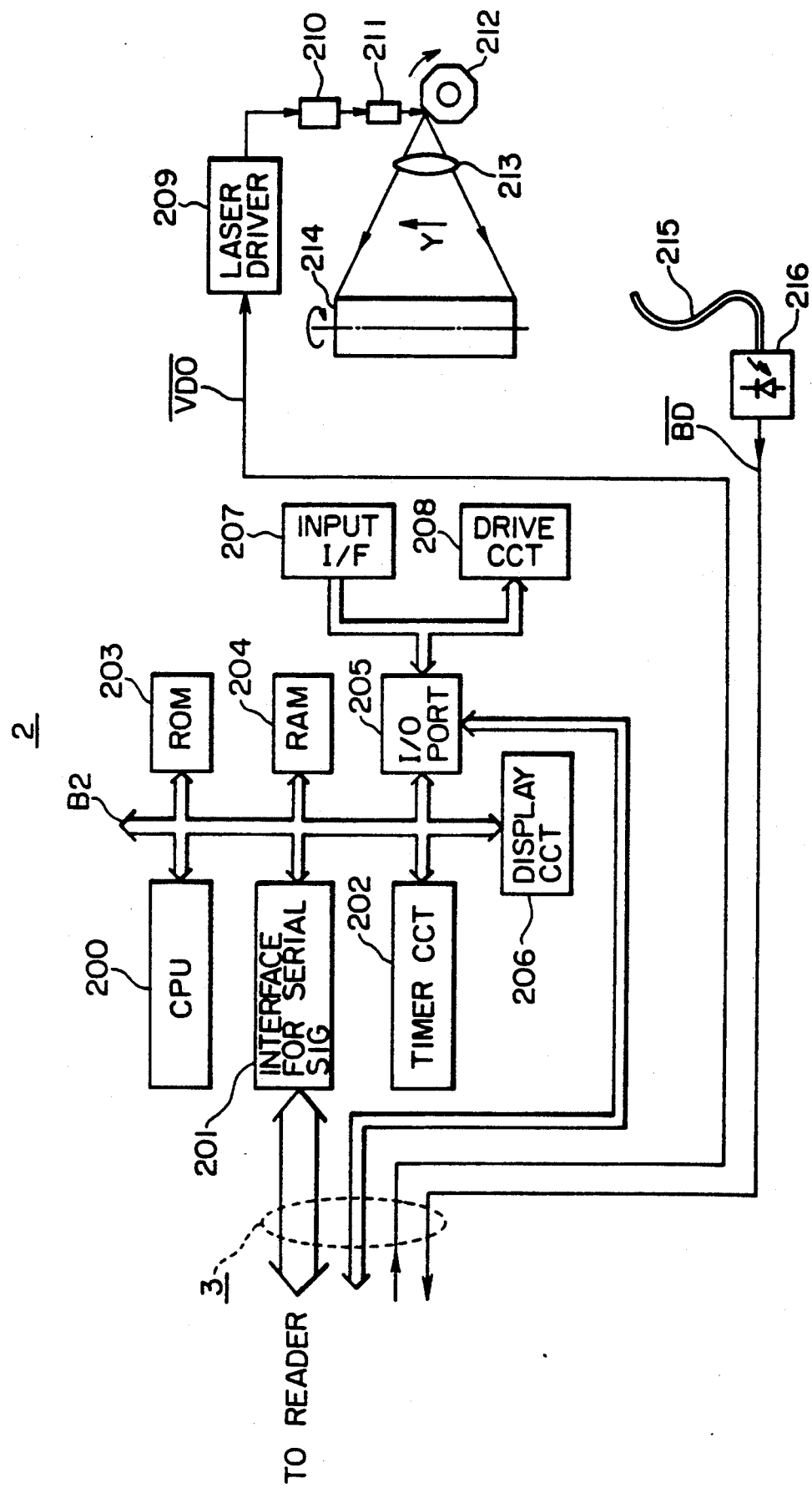
FIG. 3 is a block diagram showing an example of the configuration of the image recorder shown in FIG. 1.

FIG. 3 shows an example of a configuration of the image recorder 2 shown in FIG. 1. A CPU 200 performs various arithmetic operations and logical discriminations to allow image data reception and image recording. The CPU 200 comprises a microcomputer which controls various elements connected to a bus B2 therethrough. An interface for serial signal 201 receives the control command through the transmission cable 3 from the interface 120 (FIG. 2) of the image reader 1. The interface 201 also supplies the response data to the interface 120 of the image reader 1.

A control memory (ROM) 203 stores a control program of the CPU 200. A random-access memory (RAM) 204 is used for temporarily storing data from the various elements connected to the bus B2 and is used as a work memory of the CPU 200. An I/O port 205 is connected to an input interface (I/F) 207 and a drive circuit 208 for driving a load such as a motor (not shown) or a high-voltage transformer, and is also connected to the image reader 1. A display circuit 206 displays various states of the recorder such as the absence of recording paper sheets or the occurrence of a jam. The serial image signal transmitted from the interface 120 of the image reader 1 through the transmission cable 3 is received by the interface 201 of the image recorder 2 and is processed by the CPU 200. The CPU 200 operates in accordance with the program stored in the ROM 203 and uses the RAM 204, a timer circuit 202, the I/O port 205 and the like for overall control of the recorder.

A laser driver 209 drives a semiconductor laser 210 in accordance with the image signal $\overline{VD0}$ from the image process circuit 112. A laser beam from the laser 210 is collimated into parallel beams by a collimator lens 211. These parallel beams are then reflected by a polygonal mirror 212 and scanned in the main scan direction (indicated by arrow Y in FIG. 3) approximately parallel to a photosensitive drum 214. The beams reflected by the polygonal mirror 212 become incident on the photosensitive drum 214 rotating in the subscan direction through an f-$\theta$ lens 213 which performs light-intensity correction.

An electrostatic latent image corresponding to the image signal $\overline{VD0}$ is formed on the surface of the photosensitive drum 214. The image is then developed with a developer by the electrostatic recording method. The developed image is fixed on a recording paper sheet. The recording paper sheet with the image fixed thereon is then discharged onto a discharge tray (not shown). Since the electrostatic recording method is a known technique, the details thereof will not be described.

Before the laser beams scanned by the polygonal mirror 212 are irradiated onto the photosensitive drum 214, they are also supplied to an optical fiber 215 arranged at the side of the photosensitive drum 214. A photosensor 216 connected to the optical fiber 215 converts the light into an electric signal. This signal from the photosensor 216 is supplied as a horizontal sync signal $\overline{BD}$ to the image processing circuit 112 of the image reader 1.

Figure 4:
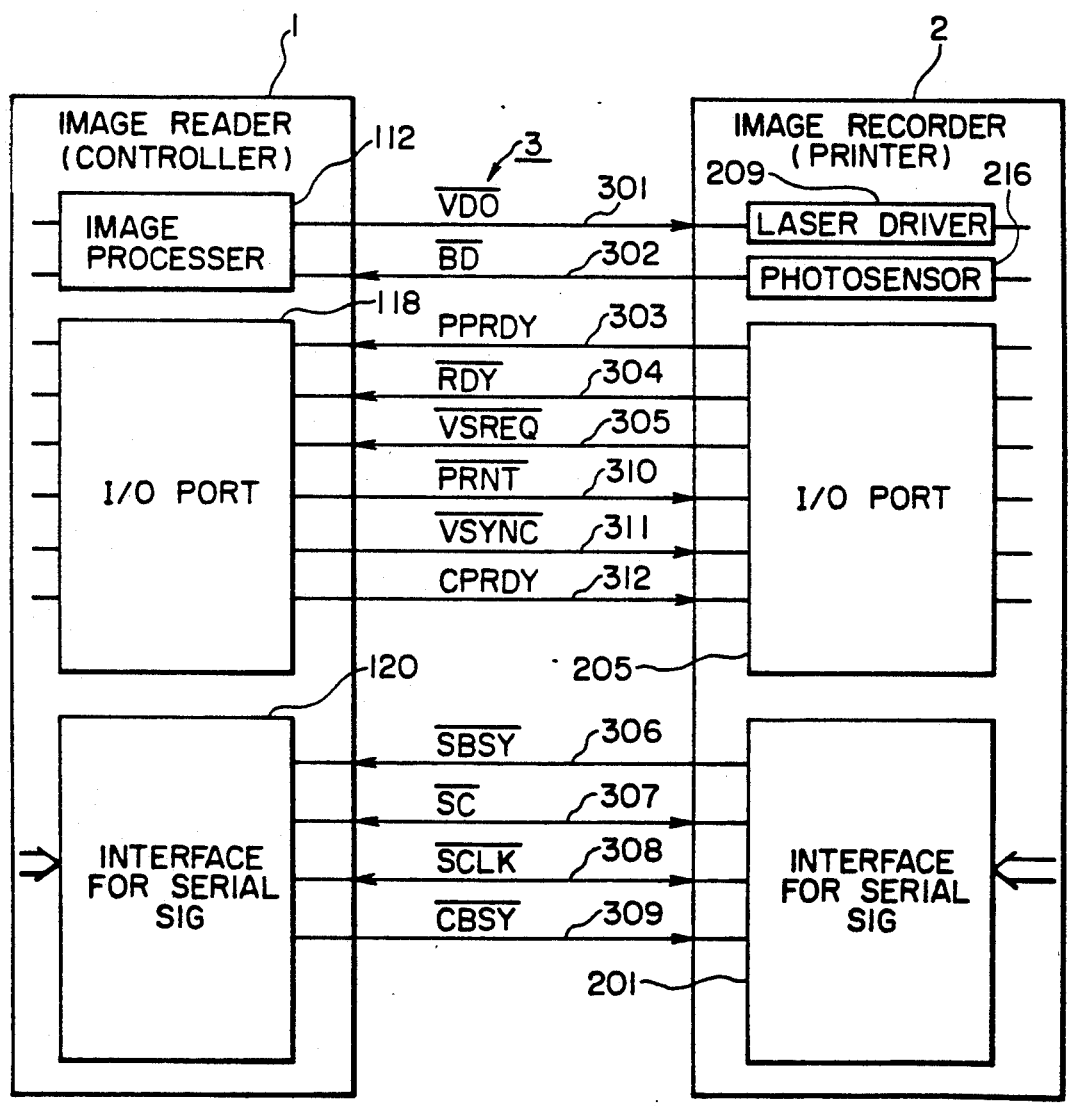
FIG. 4 is a block diagram showing an example of the configuration of a transmission cable shown in FIGS. 2 and 3.

FIG. 4 shows an example of signal lines constituting the transmission cable 3 shown in FIGS. 1 to 3. The signal transmission directions of signal lines 301 to 312 are indicated by the corresponding arrows. Table 1 below shows the names of the signals shown in FIG. 4 and the main properties thereof.

TABLE 1

| Signal name | Symbol | Properties | | |
|---|---|---|---|---|
| Horizontal sync signal | $\overline{BD}$ | Output signal | Pulse signal | Control signal |
| Printer power ready signal | PPRDY | Output signal | Level signal | Status signal |
| Ready signal | $\overline{RDY}$ | Output signal | Level signal | Status signal |
| Vertical sync data request signal | $\overline{VSREQ}$ | Output signal | Level signal | Special control signal |
| Status busy signal | $\overline{SBSY}$ | Output signal | Level signal | Control signal |
| Status/ command signal | $\overline{SC}$ | Input/ output signal | Level signal | (Operation) response (status) signal Control (command) signal |
| Serial clock signal | $\overline{SCLK}$ | Input/ output signal | Pulse signal | Response sync signal |
| Command busy signal | $\overline{CBSY}$ | Input signal | Level signal | Control signal |
| Sheet feed signal | $\overline{PRNT}$ | Input signal | Level signal | Special control signal |
| Vertical sync signal | $\overline{VSYNC}$ | Input signal | Pulse signal | Image sync signal |
| Controller power ready signal | CPRDY | Input signal | Level signal | Status signal |
| Image signal | $\overline{VD0}$ | Input signal | Level signal | Image signal |

The input signals, output signals and input/output signals shown in Table 1 above refer to the image recorder 2 (to be referred to as a printer 2 hereinafter). Therefore, an input signal is a signal which is supplied from the image reader 1 (hereinafter referred to as a controller 1) to the printer 2. Signals $\overline{BD}$, $\overline{RDY}$, $\overline{VSREQ}$, $\overline{SBSY}$, $\overline{SC}$, $\overline{SCLK}$, $\overline{CBSY}$, $\overline{PRNT}$, and $\overline{VSYNC}$ have the high level of a TTL (transistor-transistor logic) as false and the low level thereof as true. Signals PPRDY and CPRDY have the high level of the TTL as true and the low level thereof as false.

The contents of the various signals will now be described in detail with reference to FIG. 4 and table 1.

① Printer power ready signal PPRDY

Figure 5A:
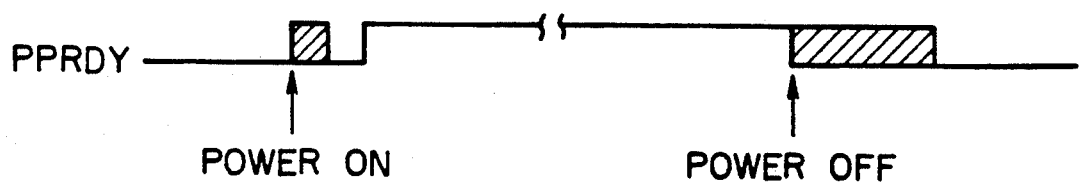
FIGS. 5A to 5G are timing charts showing the signals at the respective parts shown in FIG. 4.

The signal PPRDY is a status signal which indicates that power is supplied to the printer 2 and transmission/reception of the interface signals between the controller 1 and the printer 2 can be started. The signal PPRDY is supplied to the controller 1 through the signal line 303. When power supply to the printer 2 is stopped, the signal PPRDY goes false, as shown in FIG. 5A. The portions indicated by hatched lines in FIG. 5A represent unknown durations wherein the signal state is unknown due to transient of power on or power off. When the signal PPRDY goes false, the signals which have been received by the printer 2 are reset or cleared. Therefore, when the signal PPRDY goes true again, the controller 1 executes the control initialization upon resumption of power supply to the printer 2.

② Controller power ready signal CPRDY

Figure 5B:
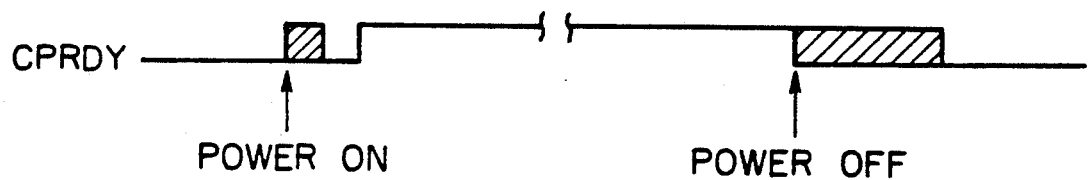

The signal CPRDY is a status signal which indicates that power is supplied to the CPU 113 of the controller 1 and transmission/reception of the interface signal between the controller 1 and the printer 2 can be started. The signal CPRDY is supplied to the printer 2 through the signal line 312. When power supply is stopped, the controller 1 renders the signal CPRDY to fall to the false level, as shown in FIG. 5B. As in the case described above, the portions indicated by hatched lines in FIG. 5B indicate unknown durations. When the signal CPRDY goes false, the other interface signals which have already been received are neglected, the contents thereof are cancelled (cleared), and the status busy signal $\overline{SBSY}$ to be described later goes false. If there is a recording paper sheet in the convey path of the printer 2, the sheet is conveyed and the initial state immediately after resumption of power to the printer 2. After the controller 1 renders the signal CPRDY true, it executes the control procedure after the power of the printer 2 is turned on.

③ Ready signal $\overline{RDY}$

The signal $\overline{RDY}$ is a status signal which represents whether the printer 2 can start or continue printing. The signal $\overline{RDY}$ is supplied to the controller 1 through the signal line 304. When printing cannot be either started or continued, e.g., when there is no more recording paper sheet, the printer 2 renders the signal $\overline{RDY}$ false. When the printer 2 renders the signal $\overline{RDY}$ false in this manner, the printer 2 will not accept any print start request or print continue request. When the factors which have contributed to render the signal $\overline{RDY}$ false have been all eliminated, the printer 2 renders the signal $\overline{RDY}$ true.

④ Paper feed signal $\overline{PRNT}$

The signal $\overline{PRNT}$ is a special control signal of the controller 1 which instructs the printer 2 to perform paper feeding. The signal $\overline{PRNT}$ is supplied to the printer 2 through the signal line 310. When the ready signal $\overline{RDY}$ described above is false, the printer 2 neglects the signal $\overline{PRNT}$.

⑤ Vertical sync data request signal $\overline{VSREQ}$

Figure 5C:
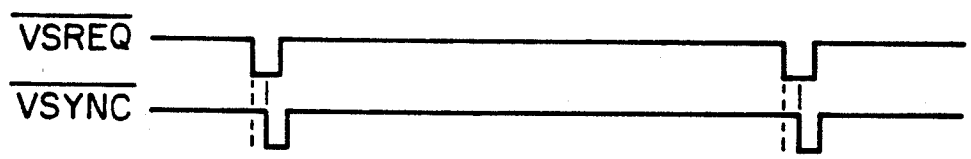

The signal $\overline{VSREQ}$ is a special control signal which indicates that the printer 2 can now receive the VSYNC to be described later. The signal $\overline{VSREQ}$ is supplied to the controller 1 through the signal line 305. As shown in FIG. 5C, after the true state of the signal $\overline{VSREQ}$ is confirmed, the vertical sync signal $\overline{VSYNC}$ is produced. When the printer 2 receives the signal $\overline{VSYNC}$ after production of the signal e,ovs/VSREQ/, it renders the signal $\overline{VSREQ}$ false.

⑥ Vertical sync signal $\overline{VSYNC}$

Figure 5D:
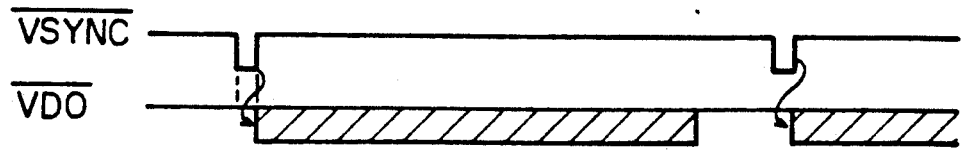
Figure 5E:
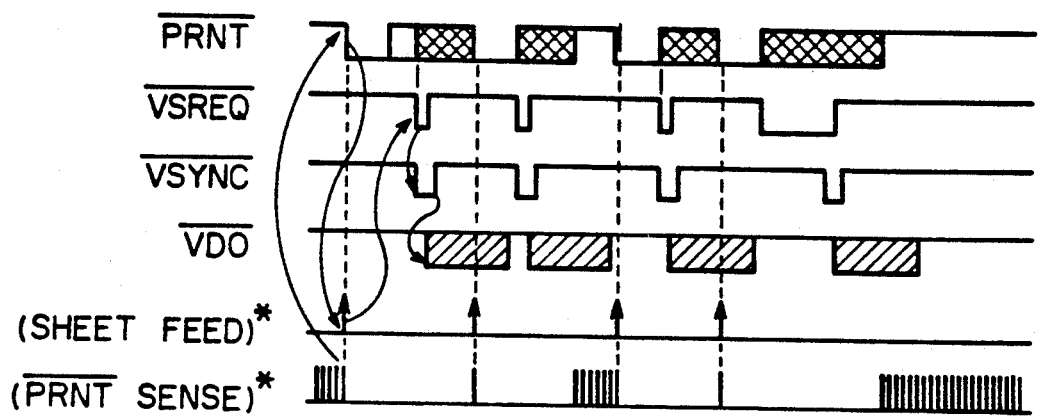

The signal $\overline{VSYNC}$ is a vertical sync signal for instructing the information data output from the controller 1 to the printer 2 and the paper feed for the printer 2. The signal $\overline{VSYNC}$ is supplied to the printer 2. As shown in FIGS. 5D and 5E, the printer 2 receives the image signal $\overline{VD0}$ to be described later in accordance with the true state of the signal $\overline{VSYNC}$. However, the printer 2 neglects the signal $\overline{VSYNC}$ which is received while the request signal $\overline{VSREQ}$ is false.

The portions indicated by the hatched lines in FIGS. 5D and 5E represent the reception duration of the image signal $\overline{VS0}$. The portions indicated by the cross-hatched lines in FIG. 5E represent "don't care" durations in which the influence of the signal $\overline{PRNT}$ is neglected. "Paper feed"* in FIG. 5E represents the timing of the paper feed operation of the printer 2. "$\overline{PRNT}$ sense"* in FIG. 5E represents the output timing of a sensor for detecting the paper feed timing.

⑦ Horizontal sync signal $\overline{BD}$

Figure 5F:
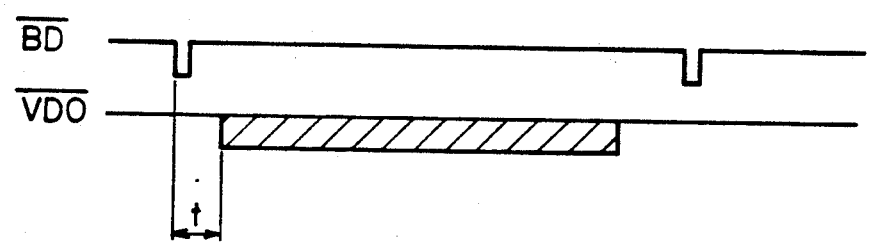

The signal $\overline{BD}$ is a horizontal sync signal of image data which indicates that the laser beam is at the start point of main scan. The signal $\overline{BD}$ is supplied to the controller 1 through the signal line 302 As shown in FIG. 5F, the controller 1 supplies to the printer 2 the image signal $\overline{VD0}$ obtained by one scan operation after time t from the leading edge of the signal $\overline{BD}$. Note that the portions indicated by the hatched lines in FIG. 5F indicate the transmission durations of the image signal $\overline{VS0}$.

⑧ Image signal $\overline{VD0}$

The signal $\overline{VD0}$ is an image signal which is transmitted from the controller 1 to the printer 2 through the signal line 301. The signal $\overline{VD0}$ is a bit-serial signal in which bits correspond to white or black dots consecutively. The signal $\overline{VD0}$ changes with the TTL high level being false and the TTL low level being true. The printer 2 records a black-and-white image in correspondence with the true or false level of the signal $\overline{VD0}$ in accordance with the raster scanning method. The controller 1 produces the signal $\overline{VD0}$ in synchronism with the vertical sync signal $\overline{VSYNC}$ for image data in the subscan direction and in synchronism with the horizontal sync signal $\overline{BD}$ for image data in the main scan direction (See FIGS. 5D and 5F).

⑨ Status/command signal $\overline{SC}$

The signal $\overline{SC}$ is a serial 8-bit signal having 8 bits (one byte) as a single message block and is bidirectionally serially transmitted through the signal line 307.

Figure 5G:
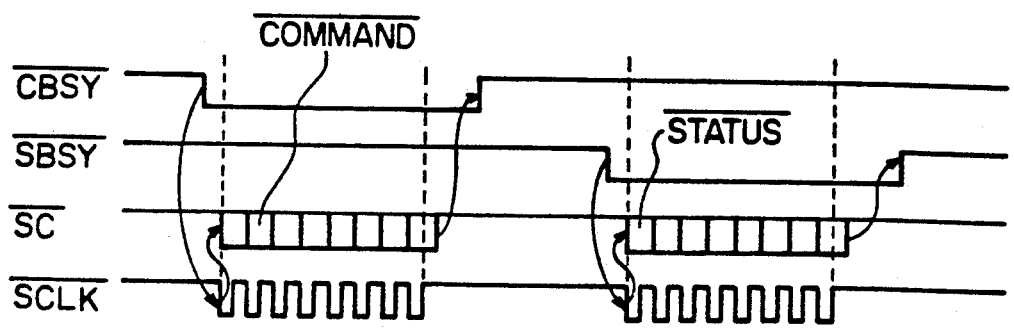

The signal e,ovs/SC/ is, in one case, transferred as command data, i.e., a command signal (control signal) from the controller 1 to the printer 2, and, in the other case, as status data, i.e., a status signal (response signal) from the printer 2 to the controller 1. When the signal $\overline{SC}$ is transferred as the command data, it is called the command signal $\overline{COMMAND}$. When the signal e,ovs/SC/ is transferred as the status data, it is called the status signal $\overline{STATUS}$. As will be described later, both the controller 1 and the printer 2 use the sync signal $\overline{SCLK}$ for fetching the signal e,ovs/SC/ and use the busy signal $\overline{SBSY}$ or $\overline{CBSY}$ for input/output control of the signal $\overline{SC}$ (FIG. 5G). In response to a 1-byte command signal $\overline{COMMAND}$ from the controller 1, the printer 2 sends the 1-byte status signal $\overline{STATUS}$. Details of the signals $\overline{COMMAND}$ and $\overline{STATUS}$ will be described later.

①⓪ Status busy signal $\overline{SBSY}$

The signal $\overline{SBSY}$ is a control signal which indicates a reception permit of the status signal $\overline{STATUS}$ from the printer 2 and is supplied to the controller 1 through the signal line 306. As shown in FIG. 5G, after confirming that the command signal $\overline{CBSY}$ to be described later is false, the printer 2 renders the signal $\overline{SBSY}$ true. The controller 1 monitors the true duration of the signal $\overline{SBSY}$ and also input of 8 pulses of the serial clock signal $\overline{SCLK}$ to be described later during the true duration of the signal $\overline{SBSY}$. When an abnormality is detected (i.e. when less than 8 pulses of the serial clock signal $\overline{SCLK}$ are detected during the true duration of the signal $\overline{SBSY}$), the controller 1 retransmits the command signal $\overline{COMMAND}$. When an abnormality is detected (i.e., when the true duration of the signal $\overline{SBSY}$ is abnormal), the controller 1 renders the controller power ready signal CPRDY false so as to initialize the interface.

①① Command busy signal $\overline{CBSY}$

The signal $\overline{CBSY}$ is a control signal which indicates a reception permit of the command signal $\overline{COMMAND}$ and is produced prior to production of the command signal $\overline{COMMAND}$ from the controller 1. The signal $\overline{CBSY}$ is supplied to the printer 2 through the signal 309. As shown in FIG. 5G, after confirming that the status busy signal $\overline{SBSY}$ is false, the controller 1 renders the signal $\overline{CBSY}$ true. The printer 2 monitors input of 8 pulses of the serial block signal $\overline{SCLK}$ during the true duration of the signal $\overline{CBSY}$. When the number of serial clock pulses received in the true duration of the signal $\overline{CBSY}$ is less than 8, the printer 2 sends back a status signal $\overline{STATUS}$ indicating a parity error. Upon reception of the status signal $\overline{STATUS}$ indicating a parity error, the controller 1 retransmits a command signal $\overline{COMMAND}$.

①② Serial clock signal $\overline{SCLK}$

The signal $\overline{SCLK}$ is a pulse signal which is used by the printer 2 to fetch the command signal $\overline{COMMAND}$ and by the controller 1 to fetch the status signal $\overline{STATUS}$. The signal $\overline{SCLK}$ is transmitted through the signal line 308. The signal $\overline{SCLK}$ for allowing the printer 2 to fetch the command signal $\overline{COMMAND}$ is produced by the controller 1. Meanwhile, the signal $\overline{SCLK}$ for allowing the controller 1 to fetch the status signal $\overline{STATUS}$ is produced by the controller 1. Which one of the controller 1 and the printer 2 is to produce the signal $\overline{SCLK}$ is determined in accordance with the command signal $\overline{COMMAND}$. The details of this determination procedures will be described later. However, either one of the controller 1 and the printer 2 alone can produce the signal $\overline{SCLK}$ for the two purposes, and the procedures of this determination can be omitted. As shown in FIG. 5G, the signal $\overline{SCLK}$ is produced in the form of 8 pulses after the true state of the command busy signal $\overline{CBSY}$ or the status busy signal $\overline{SBSY}$ is confirmed. The controller 1 or the printer 1 produces the command signal $\overline{COMMAND}$ or the status signal $\overline{STATUS}$ at the timing of the trailing edge of the signal $\overline{SCLK}$ and fetches the produced signal at the leading edge thereof. Of the signals described above, those which are produced by the I/O ports 118 and 205 are basic control signals for performing the basic operations for image recording.

FIGS. 6A to 6I show examples of the configurations of the circuits for transmitting the respective signals shown in FIG. 4. Referring to FIGS. 6A to 6I, signal lines 503, 515, 521, 531, 536, 550, 555, 566 and 572 (corresponding to the lines 301 to 312 shown in FIG. 4) and return lines 504, 516, 522, 532, 537, 551, 556, 567 and 573 may comprise twisted pair wires or flat cables.

Figure 6A:
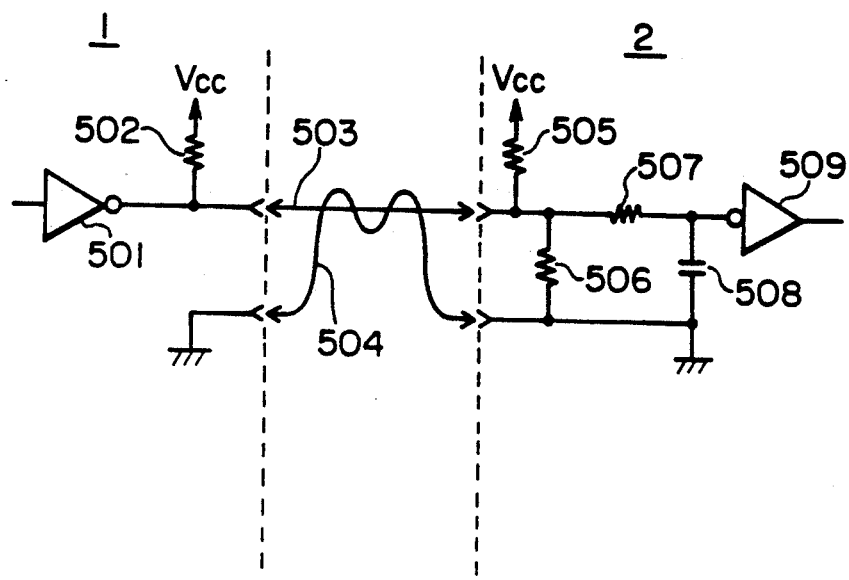
FIGS. 6A to 6I are circuit diagrams showing examples of the configuration of an interface section for performing signal transmission shown in FIG. 4.
Figure 6B:
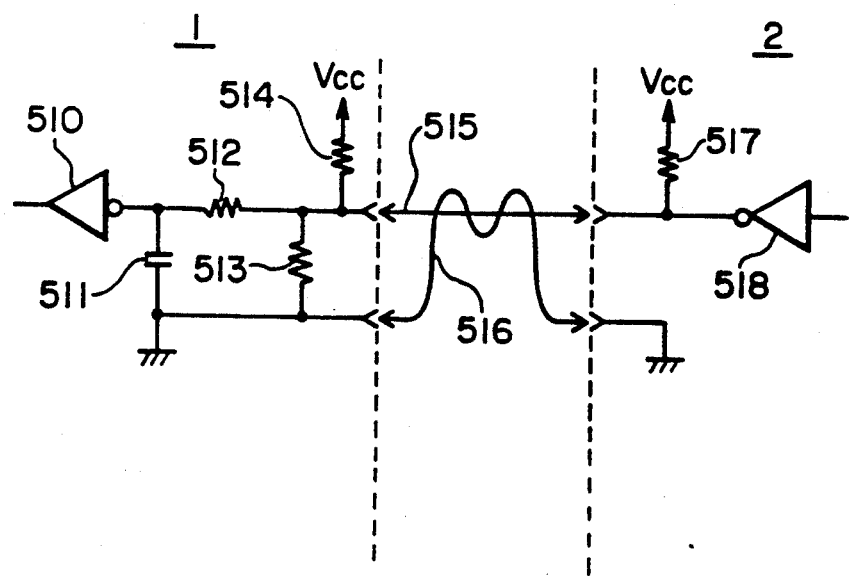
Figure 6C:
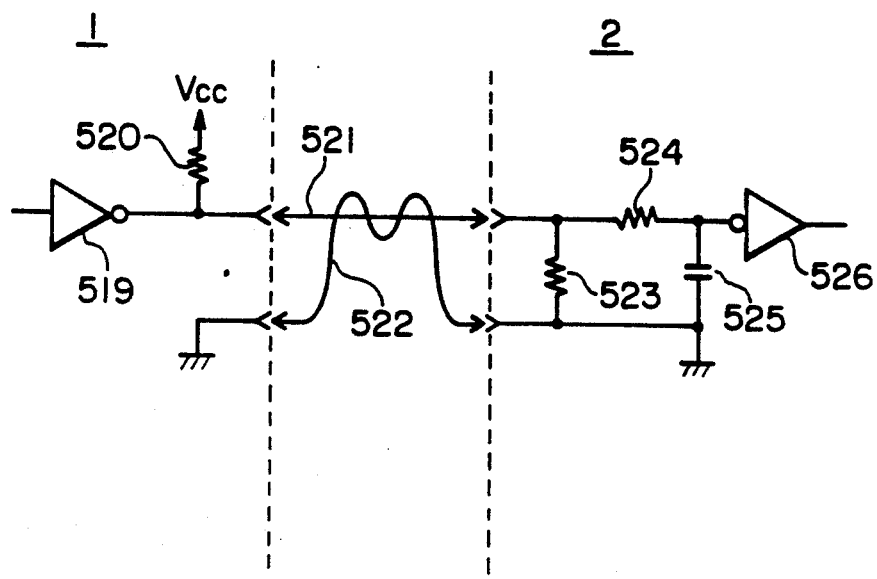
Figure 6D:
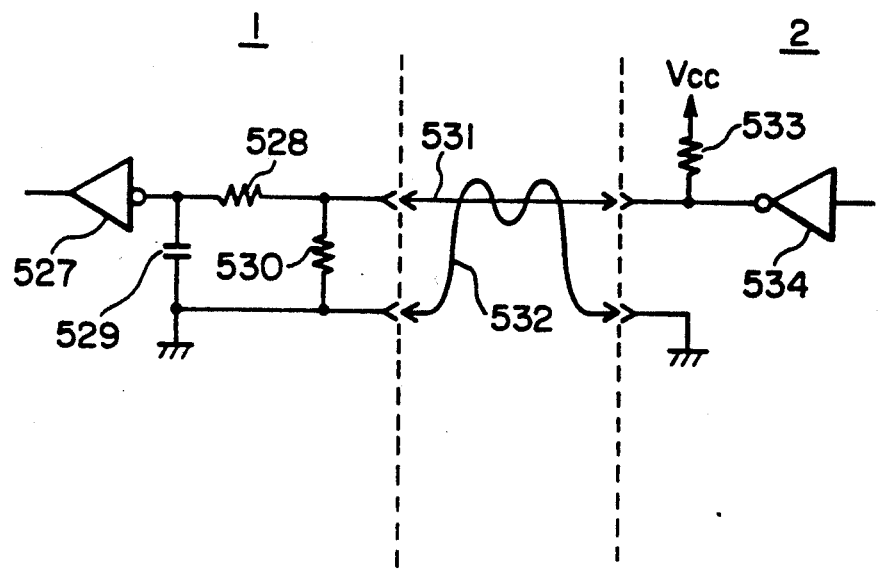
Figure 6E:
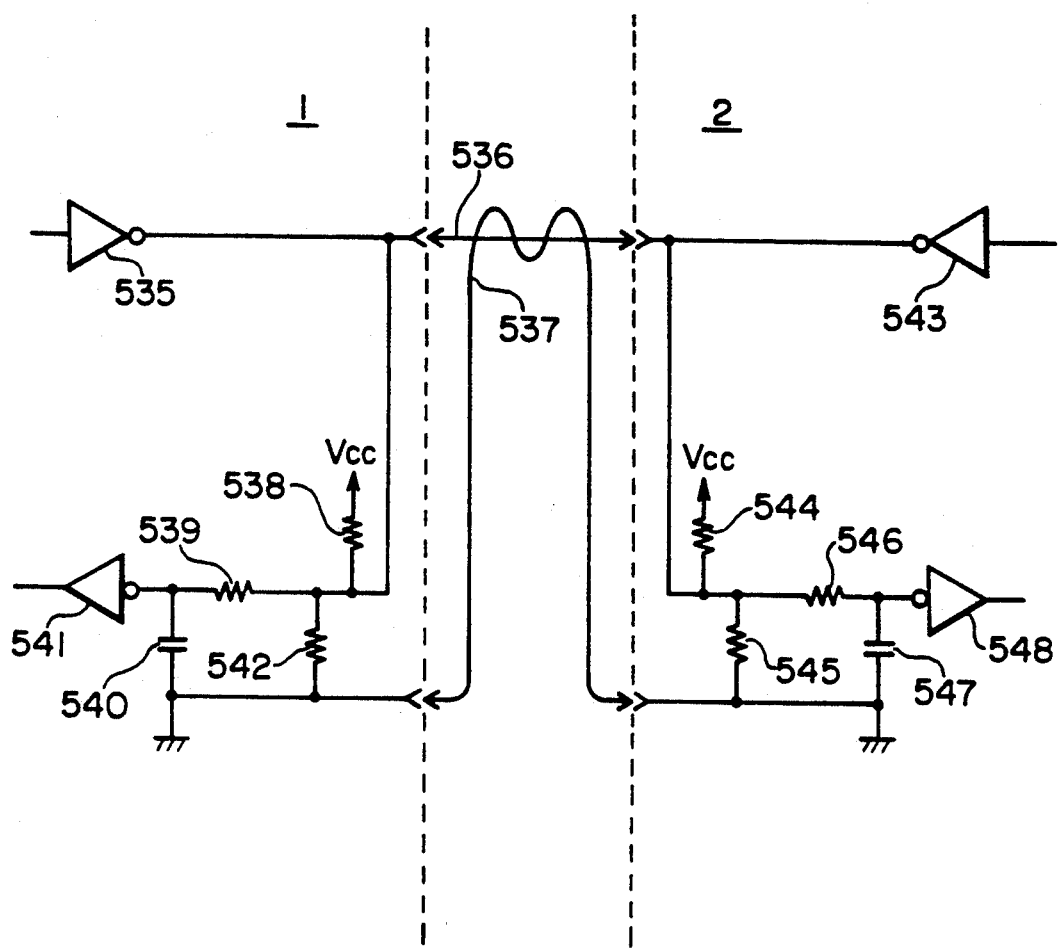

FIG. 6A shows the circuit for transmitting the signals $\overline{CBSY}$, $\overline{PRNT}$ and $\overline{VSYNC}$. FIG. 6B shows the circuit for transmitting the signals $\overline{RDY}$, $\overline{VSREQ}$ and $\overline{SBSY}$. FIG. 6C shows the circuit for transmitting the signal CPRDY. FIG. 6D shows the circuit for transmitting the signal PPRDY. FIG. 6E shows the circuit for transmitting the signals $\overline{SC}$ and $\overline{SCLK}$. The circuits shown in FIGS. 6A to 6E include output driver ICs (integrated circuits, e.g., SN7438 or equivalents) 501, 519 and 535 at the side of the controller 1; input buffer ICs (e.g., SN74LS14 or equivalents) 510, 527 and 541 at the side of the controller 1; output driver ICs (e.g., SN7438 or equivalents) 518, 534, and 543 at the side of the printer 2; and input buffer ICs (e.g., SN74LS14 or equivalents) 509, 526 and 548 at the side of the printer 2. Pull-up resistors 502, 05, 514, 517, 520, 533, 538 and 544 are included for guaranteeing the high level. Pull-down resistors 506, 13, 523, 530, 542 and 545 are included for impedance matching and low level guarantee. Paired resistors and capacitors 507 and 508, 511 and 512, 524 and 525, 28 and 529, 539 and 540, and 546 and 547, respectively, constitute noise removal CR circuits.

Figure 6F:
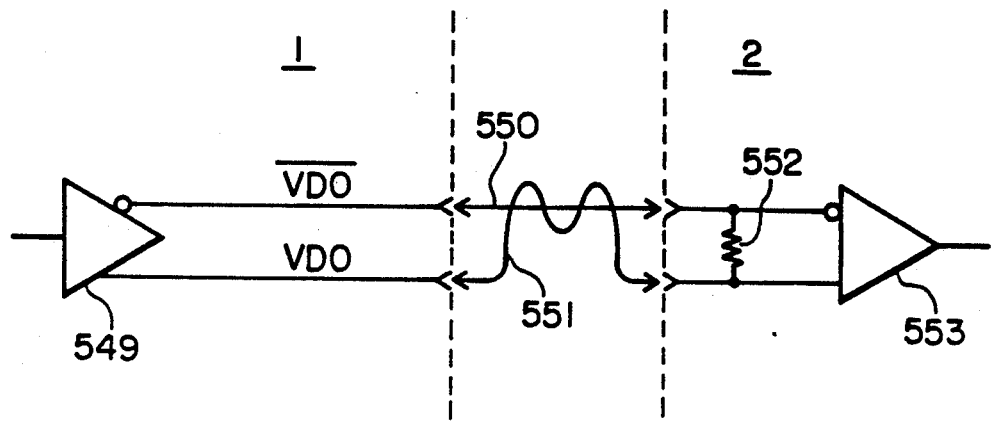
Figure 6G:
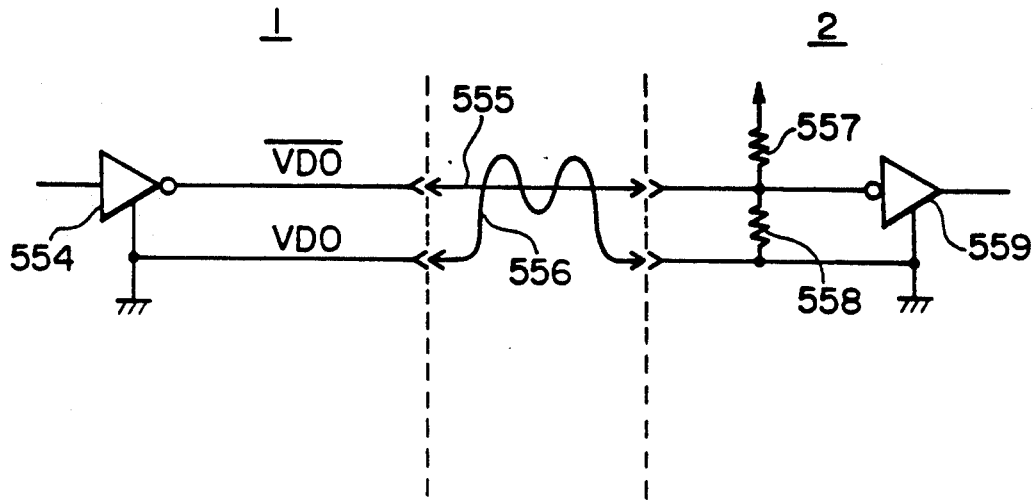
Figure 6H:
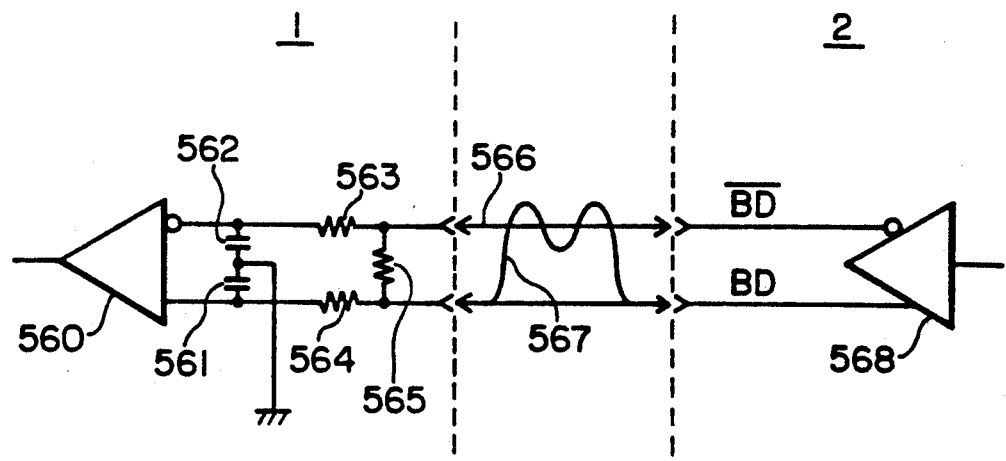
Figure 6I:
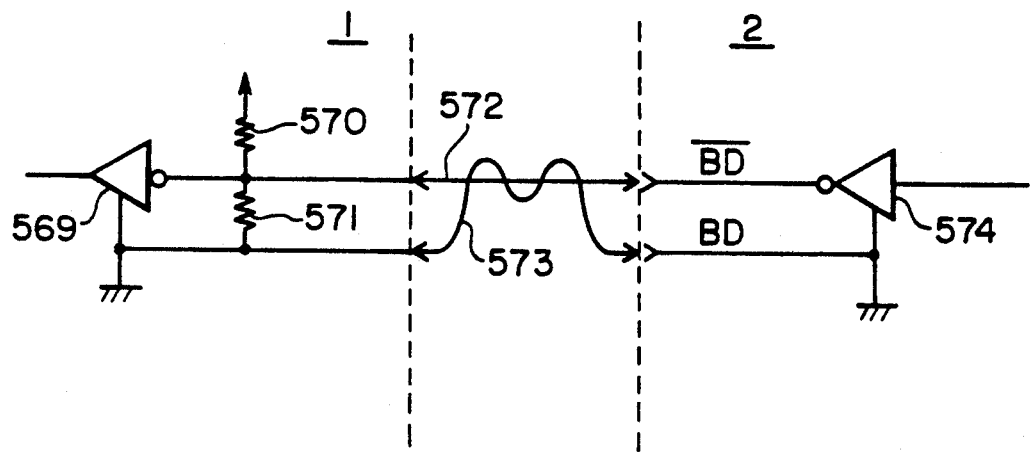

FIGS. 6F and 6G show examples of the circuit for transmitting the signal $\overline{VSO}$. FIGS. 6H and 6I show examples of the circuit for transmitting the signal $\overline{BD}$. The system of the present invention uses the circuit shown in FIG. 6F or 6H and that shown in FIG. 6G or 6I. The circuits shown in FIGS. 6F to 6I include line driver ICs (e.g., SN75113 or equivalents) 549 and 568; line receiver ICs (e.g., SN75115 or equivalents) 553 and 560; output driver ICs (e.g., F240 or equivalents); and input buffer ICs (e.g., F240 or equivalents) 559 and 569. Resistors 552 and 565 are included for removing noise. Pull-up resistors 557 and 570 are for guaranteeing the high level. Pull-down resistors 558 and 571 are for impedance matching and low level guarantee. Paired resistors and capacitors 561 and 562, and 563 and 564 are for removing the noise. A power source voltage Vcc is, for example, 5 V.

Figure 7:
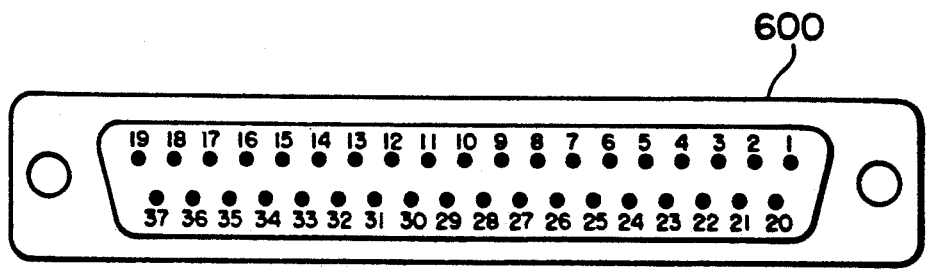
FIG. 7 is a front view showing an example of a connector for connecting signal lines shown in FIG. 4.

FIG. 7 shows an example of a connector for connecting the signal lines 301 to 312. Note that a connector 500 is connected at the position indicated by the broken lines in FIGS. 6A to 6I. The connector 600 may comprise a 37-pin D-SUB connector. Table 2 below shows the pin arrangement of this connector.

TABLE 2

| Type of signal | Pin No. | | Type of signal |
| --- | --- | --- | --- |
| (For expansion) | 1 | 20 | (For expansion) |
| $\overline{BD}$ | 2 | 21 | BD (return) |
| PPRDY | 3 | 22 | Return (GND line) |
| $\overline{RDY}$ | 4 | 23 | Return (GND line) |
| $\overline{VSREQ}$ | 5 | 24 | Return (GND line) |
| $\overline{SBSY}$ | 6 | 25 | Return (GND line) |
| $\overline{SC}$ | 7 | 26 | Return (GND line) |
| $\overline{SCLK}$ | 8 | 27 | Return (GND line) |

TABLE 2-continued

| Type of signal | Pin No. | | Type of signal |
|---|---|---|---|
| $\overline{\text{CBSY}}$ | 9 | 28 | Return (GND line) |
| $\overline{\text{PRNT}}$ | 10 | 29 | Return (GND line) |
| $\overline{\text{VSYNC}}$ | 11 | 30 | Return (GND line) |
| CPRDY | 12 | 31 | Return (GND line) |
| $\overline{\text{VD0}}$ | 13 | 32 | VD0 (return) |
| (For expansion) | 14 | 33 | (For expansion) |
| (For expansion) | 15 | 34 | (For expansion) |
| (For expansion) | 16 | 35 | (For expansion) |
| (For expansion) | 17 | 36 | (For expansion) |
| (For expansion) | 18 | 37 | (For expansion) |
| (For expansion) | 19 | | |

Tables 3-1 and 3-2 below shows examples of the command signal $\overline{\text{COMMAND}}$ (to be referred to as a command hereinafter) which are transmitted through the $\overline{\text{SC}}$ signal line 307. Tables 4A to 4K show examples of the status signal $\overline{\text{STATUS}}$ (to be referred to as a status hereinafter) which are transmitted through the $\overline{\text{SC}}$ signal line 307.

The status or command shown in Table 4 or 3, respectively, comprises 8 bits and is transmitted onto the $\overline{\text{SC}}$ signal line 307 from its MSB (bit 7). The LSB (bit 0) is a parity bit in either of the status or command. A parity in this case is an odd parity. The command is coded from the MSB to bit 1 excluding the parity bit. The command can be a status request command for requesting the printer status data (error, paper size, etc.) to the printer 2 or a command for requesting execution of the operation of the printer 2.

Upon reception of one of status request commands SR0 to SR9, the printer 2 sends back the corresponding status (statuses 0 to 9) to the controller 1. Upon reception of one of the execution commands EC0 to EC14, the printer 2 executes the operation corresponding to the received command and sends back the status 0 (overall status) to the controller 1. When an error is caused in the received command at the printer 2 (e.g., when the parity error is caused or 8 pulses of the busy signal $\overline{\text{CBSY}}$ are not received during the true duration of the sync signal $\overline{\text{SCLK}}$), the printer 2 sends back the parity error status to the controller 1. When there is no processing corresponding to the input command, the printer 2 sends back the command error status to the controller 1.

TABLE 3-1

| Type of command | Code | Status request/ execution | Function | Corresponding status |
|---|---|---|---|---|
| SR 0 | 01 | Status request | Request status 0 (overall status) | Status 0 |
| SR 1 | 02 | Status request | Request status 1 (operator call error) | Status 1 |
| SR 2 | 04 | Status request | Request status 2 (serviceman call error) | Status 2 |
| SR 3 | 07 | Status request | Request status 3 (misprint detail) | Status 3 |
| SR 4 | 08 | Status request | Request status 4 (retransmission request number) | Status 4 |
| SR 5 | 0B | Status request | Request status 5 (lower cassette sheet size) | Status 5 |
| SR 6 | 0D | Status request | Request status 6 (upper cassette sheet size) | Status 6 |
| SR 7 | 0E | Status request | Request status 7 (application) | Status 7 |
| SR 8 | 10 | Status request | Request status 8 (sorter error detail) | Status 8 |
| SR 9 | 13 | Status request | Request status 9 (printer pause detail) | Status 9 |

TABLE 3-2

| Type of command | Code | Status request/ execution | Function | Corresponding status |
|---|---|---|---|---|
| EC 0 | 40 | Execution | designate signal $\overline{\text{SCLK}}$ controller output mode | Status 0 |
| EC 1 | 43 | Execution | designate signal $\overline{\text{SCLK}}$ printer output mode | Status 0 |
| EC 2 | 45 | Execution | set pause | Status 0 |
| EC 3 | 46 | Execution | reset pause | Status 0 |
| EC 4 | 49 | Execution | start drum | Status 0 |
| EC 5 | 4A | Execution | stop drum | Status 0 |
| EC 6 | 4C | Execution | feed cassette sheet | Status 0 |
| EC 7 | 4F | Execution | feed sheet manually | Status 0 |
| EC 8 | 51 | Execution | feed lower cassette sheet | Status 0 |
| EC 9 | 52 | Execution | feed upper cassette sheet | Status 0 |
| EC 10 | 54 | Execution | set power saving mode | Status 0 |
| EC 11 | 57 | Execution | reset power saving mode | Status 0 |
| EC 12 | 58 | Execution | start interrupt copy | Status 0 |
| EC 13 | 5B | Execution | restart copy after interrupt | Status 0 |
| EC 14 | 5D | Execution | release retransmission request | Status 0 |

TABLE 4

(A)

| Command error status | |
|---|---|
| Bit 7 | 1 |
| Bit 6 | Parity error |
| Bit 5 | — |
| Bit 4 | — |
| Bit 3 | — |
| Bit 2 | — |
| Bit 1 | — |
| Bit 0 | Parity bit |

(B)

| Status 0 (overall status) | |
|---|---|
| Bit 7 | 0 |
| Bit 6 | Print request |
| Bit 5 | Sheet feeding |
| Bit 4 | Occurrence of misprint |
| Bit 3 | Wait mode |
| Bit 2 | Pause mode |
| Bit 1 | Occurrence of call error |
| Bit 0 | Parity bit |

(C)

Status 1 (operator call error status)

TABLE 4-continued

|  | Bit 7 | 0 |
|---|---|---|
|  | Bit 6 | No toner |
|  | Bit 5 | Overflow of user toner |
|  | Bit 4 | No sheet |
|  | Bit 3 | Occurrence of jam |
|  | Bit 2 | Occurrence of sorter error |
|  | Bit 1 | — |
|  | Bit 0 | Parity bit |

(D)
Status 2 (serviceman call error status)

| Bit 7 | 0 |
|---|---|
| Bit 6 | Fixing unit error |
| Bit 5 | BD error |
| Bit 4 | Scanner error |
| Bit 3 | Peltier error |
| Bit 2 | Drum motor error |
| Bit 1 | Counter failure |
| Bit 0 | Parity bit |

(E)
Status 3 (misprint status)

| Bit 7 | 0 |
|---|---|
| Bit 6 | Misprint (BD error) |
| Bit 5 | — |
| Bit 4 | — |
| Bit 3 | — |
| Bit 2 | — |
| Bit 1 | — |
| Bit 0 | Parity bit |

(F)
Status 4 (retransmission request number status)

| Bit 7 | 0 |
|---|---|
| Bit 6 | Retransmission request number |
| Bit 5 | Retransmission request number |
| Bit 4 | Retransmission request number |
| Bit 3 | Retransmission request number |
| Bit 2 | Retransmission request number |
| Bit 1 | Retransmission request number |
| Bit 0 | Parity bit |

(G)
Status 5 (lower cassette sheet size status)

| Bit 7 | 0 |
|---|---|
| Bit 6 | Sheet size |
| Bit 5 | Sheet size |
| Bit 4 | Sheet size |
| Bit 3 | Sheet size |
| Bit 2 | Sheet size |
| Bit 1 | Sheet size |
| Bit 0 | Parity bit |

(H)
Status 6 (upper cassette sheet size status)

| Bit 7 | 0 |
|---|---|
| Bit 6 | Sheet size |
| Bit 5 | Sheet size |
| Bit 4 | Sheet size |
| Bit 3 | Sheet size |
| Bit 2 | Sheet size |
| Bit 1 | Sheet size |
| Bit 0 | Parity bit |

(I)
Status 7 (application status)

| Bit 7 | 0 |
|---|---|
| Bit 6 | Sorter used |
| Bit 5 | — |
| Bit 4 | — |
| Bit 3 | — |
| Bit 2 | — |
| Bit 1 | Two trays used |
| Bit 0 | Parity bit |

(J)
Status 8 (sorter error detail status)

| Bit 7 | 0 |
|---|---|
| Bit 6 | Sorter jam |
| Bit 5 | Sorter error |
| Bit 4 | — |
| Bit 3 | — |
| Bit 2 | — |
| Bit 1 | — |
| Bit 0 | Parity bit |

(K)
Status 9 (pause mode detail status)

| Bit 7 | 0 |
|---|---|
| Bit 6 | Shutoff mode |
| Bit 5 | Power saving mode |
| Bit 4 | — |
| Bit 3 | — |
| Bit 2 | — |
| Bit 1 | — |
| Bit 0 | Parity bit |

The commands shown in Tables 3-1 and 3-2 above will first be described. In the code column of Tables 3-1 and 3-2, the codes of the commands are indicated in the hexadecimal notation including the parity bit. The column of status request/execution indicates whether the corresponding command is a status request command or an execution command. The column of function indicates the function of each command. The column of the corresponding status indicates the contents (Table 4) of the status which is supplied from the printer 2 to the controller 1 when the command is received by the printer 2 without any error. The status request commands SR0 to SR9 are for requesting the statuses corresponding to the respective commands to the printer 2.

The execution commands EC0 and EC1 are commands which indicate which one of the controller 1 and the printer 2 is to produce the serial clock signal $\overline{SCLK}$ for the status signal. These commands must be produced first when the power of the printer 2 is turned on. However, these commands can be omitted and the printer 2 can always produce the signal $\overline{SCLK}$. When the status signal $\overline{STATUS}$ is supplied to the controller 1 and the signal $\overline{SCLK}$ is not produced from the designated side, the controller 1 retransmits either the command EC0 or EC1. The command EC0 indicates the mode wherein the signal $\overline{SCLK}$ is produced by the controller 1 and the command EC1 indicates the mode wherein the signal $\overline{SCLK}$ is produced by the printer 2.

Commands EC2 and EC3 are for instructing or releasing the pause mode of the printer 2. Commands EC4 and EC5 are related to rotation of the drum 214 of the printer 2 (FIG. 3). Note that the command EC4 instructs start of drum rotation. Upon reception of the command EC4, the printer 2 starts the initial rotation of the drum 214 if the drum 214 has been stopped, and performs the initial processing for the printing operation (image recording). However, if the drum 214 is being rotated at the time when the command EC4 is received, the printer 2 continues to rotate the drum 214. Commands EC12 and EC13 are for instructing the start of drum rotation in the case of the interrupt. The printer 2 also performs a special operation during the interrupt in accordance with the type of command received. For example, the printer 2 also performs control of the sorter (not shown) connected to the printer 2, or the like.

Command EC5 is a command for instructing stop of the drum rotation. Upon reception of the command EC5, the printer 2 performs the postprocessing of the image recording and stops the drum 214. However, if the printer is in the printing process (image recording) when the command EC5 is received, the printer performs the instructed operation after such image recording is completed. Commands EC6, EC7, EC8 and EC9 are for instructing the method of paper feed for the printer 2. When one of these commands EC6, EC7, EC8 and EC9 is received, the printer 2 continues to feed the recording paper sheets in accordance with the method corresponding to the received command until the next command is received. Commands EC10 and EC11 are for instructing the power saving mode. The printer 2 operates in the power saving mode upon reception of the command EC10, and releases the power saving mode upon reception of the command EC11. Command EC14 is for releasing the retransmission request of the command data from the printer 2. $ The statuses shown in Tables 4(A) to 4(K) will now be described.

Each of statuses shown in Tables 4(A) to 4(K) consists of 8 bits, and its LSB (bit 0) is an odd parity bit. Each bit is "1" when the corresponding phenomenon (right column) is occurring and is "0" when such phenomenon is not occurring.

Table 4(A) shows a command error status. When a command error occurs, bit 7 is "1" and bit 6 is "0". When a parity error occurs, bit 7 is "1" and bit 6 is also "1". When this status is generated, the controller 1 must produce the command again.

Table 4(B) shows a status 0 (overall status). The status indicates the overall status of the printer 2 and is returned to the controller 1 from the printer 2 when the controller 1 produces the status 0 request command SR0 or one of the execution commands EC0 to EC14. Bit 7 is "0". Bit 6 indicates a print request. Bit 6 is "1" when the paper feed can be performed by the signal $\overline{PRNT}$. Bit 6 is "0" after the signal $\overline{PRNT}$ is received or when the paper feed cannot be performed upon reception of the signal $\overline{PRNT}$. Bit 5 indicates that the paper feed is being performed. Bit 5 is "1" when there is a paper sheet being fed in the printer 2 and is "0" when all the paper sheets have been discharged onto a tray (not shown). When a jam or misprint occurs, bit 5 goes to "0" and at this timing the retransmission request number due to an error is determined. Bit 4 is "1" when a misprint is caused during the printing operation. Details of the misprint are indicated by a status 3 (misprint status). Bit 3 is "1" when the printer 2 is in the wait mode due to a low temperature of the fixing unit and is "0" when the wait mode is released. Bit 2 indicates that the printer 2 is in the pause mode and the details of the pause mode are indicated by a status 9 to be described later. Bit 1 indicates occurrence of an operator call error or a serviceman call error which is indicated by the status 1 and status 2, respectively. Details of such an error are indicated in the status 1 or status 2 to be described later.

Table 4(C) shows the status 1 (operator call error status). Table 4(D) indicates the status 2 (serviceman call error status). In either of the statuses 1 and 2, a bit corresponding to an error which has been caused is "1" and is "0" when such an error is released. Table 4(E) shows a status 3 (misprint status). The status 3 indicates the details of a misprint.

Table 4(F) shows a status 4 (retransmission request number status). The status 4 indicates, in a binary number of bits 1 to 6, the number of images requested to be retransmitted due to a jam or a misprint. Tables 4(G) and 4(H) show statuses to indicate the paper size of the upper and lower cassettes, respectively, of the printer 2. More specifically, Table 4(G) shows a status 5 (lower cassette paper size status) while Table 4(H) shows a status 6 (upper cassette paper size status). In either of statuses 5 and 6, the paper size is indicated by 6 bits 1 to 6. Table 5 below shows the correspondence between the codes and the corresponding paper sizes. The codes in Table 5 show 6-bit binary numbers in the hexadecimal notation.

TABLE 5

| Code | Sheet size |
| --- | --- |
| 00 | No cassette |
| 01 | A4-R (length) |
| 02 | A4 (width) |
| 03 | A3 (length) |
| 04 | Letter-R (length) |
| 05 | B4 (length) |
| 06 | B5 (width) |
| 08 | Letter (width) |
| 09 | B5-R (length) |
| 0A | Ledger (length) |
| 0B | Mini (length) |
| 0C | Legal (length) |
| 16 | Manual sheet feed (A3 scanning) |
| 17 | Manual sheet feed (ledger scanning) |
| 18 | U1 (B4; B4 scanning) |
| 19 | U1 (8" × 13", Foolscap, Australia-Foolscap, legal; legal scanning) |
| 1A | U2 (B6, modified A6; B6 scanning) |
| 1B | U2 (min; mini scanning) |
| 1C | U3 (B5; B5 scanning) |
| 1D | U3 (letter, 8 × 10, Argentine-letter; letter scanning) |
| 20 | U3R (B5-R scanning) |
| 21 | U3R (letter-R, 8 × 10, Argentine-letter; letter-R scanning) |

Table 4(I) shows a status 7 (application status). The status 7 indicates connection or disconnection of application equipment such as a sorter with the printer 2. Table 4(J) shows a status 8 (sorter error detail status) which indicates details of a sorter error. Table 4(K) shows a status 9 (pause detail status) which indicates the details of the pause mode.

Figure 8:
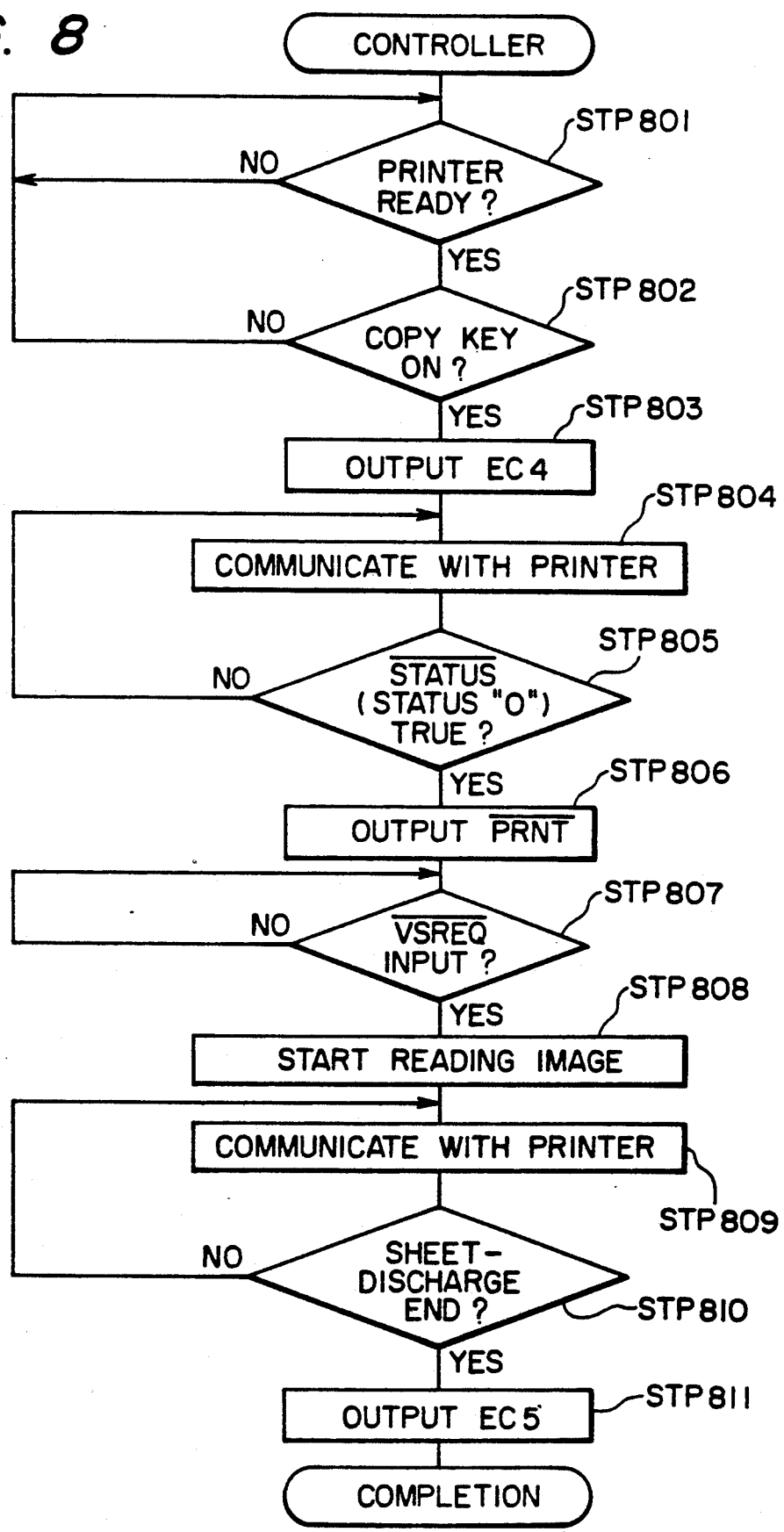
FIG. 8 is a flow chart showing the operation of the image reader shown in FIG. 2.

FIGS. 8 and 9 show examples of flow charts for executing the communication control of the respective signals described above. The flow charts include steps STP801 to STP811 and STP901 to STP918, respectively.

The flow chart shown in FIG. 8 shows the control sequence of a program stored in the ROM 114 at the side of the controller 1. The flow chart shown in FIG. 9 shows the control sequence of a program stored in the ROM 203 at the side of the printer 2. These flow charts will now be described with reference to these figures.

When the printer (image recorder) 2 is operating normally (STP901), the ready signal $\overline{RDY}$ is true (STP902). When a copy key is on at the controller (image reader, reader) 1 (STP801 and STP802), the drum start command EC4 is produced by the controller 1 (STP803). When the drum start command EC4 is received (STP904), the printer 2 starts initial rotation (STP905). When the printer 2 completes the initial rotation and the paper feed can be performed (STP906), a print request is produced by a signal $\overline{STATUS}$ of status 0 (STP907). & When the signal $\overline{STATUS}$ indicating the print request is true (STP804 and STP805), the controller 1 renders the print signal $\overline{PRNT}$ true (STP806). Then, the printer 2 starts paper feeding (STP908 and STP909). When the printer 2 starts paper feeding and the paper sheet reaches a given position (STP910) and the image signal $\overline{VDO}$ can now be received, the printer 2 renders the request signal $\overline{VSREQ}$ true (STP911) and temporarily stops the paper feeding operation (paper conveying operation) (STP912). This temporary stop of the paper feeding operation is performed so as to perform restart of recording in STP914 at a proper timing on the recording paper sheet by the signal $\overline{\text{VSYNC}}$ in accordance with the image signal $\overline{\text{VD0}}$.

The horizontal sync signal $\overline{\text{BD}}$ is periodically produced from the printer 2. After the reception of the request signal $\overline{\text{VSREQ}}$, the controller 1 starts image reading in synchronism with the horizontal sync signal $\overline{\text{BD}}$ (STP807 and STP808). In other words, prior to the image reading, the controller 1 transmits the vertical sync signal $\overline{\text{VSYNC}}$ in response to the request signal $\overline{\text{VSREQ}}$. Thereafter, the controller 1 periodically produces the image signal $\overline{\text{VD0}}$ in synchronism with the horizontal sync signal $\overline{\text{BD}}$ (STP809; FIGS. 5C to 5F).

When the vertical sync signal $\overline{\text{VSYNC}}$ is received (STP913), the printer 2 restarts the paper feeding operation and thereafter performs image recording on the recording paper sheet in accordance with the image signal $\overline{\text{VD0}}$ (STP914). When the image recording on the recording paper sheet (printing paper sheet) is performed in this manner and the paper sheet is discharged (STP915), the printer 2 renders false the signal $\overline{\text{STATUS}}$ of status 0 indicating the paper feeding operation of the paper sheet and signals to the controller 1 the end of sheet discharging (STP916).

Upon reception of the signal indicating the end of paper discharging (STP810), the controller 1 sends a signal $\overline{\text{COMMAND}}$ (drum stop command EC5) (STP811). Upon reception of this signal, the printer 2 stops operating (STP917 and STP918). For the sake of easy understanding, the transmission/reception of various signals is shown in the order according to which it occurs.

In the embodiment described above, since the control response data (command and status data) of image data comprises a serial signal consisting of a plurality of bits, the number of signal lines can be reduced. In addition to this, the system of the present invention can be applied generally and allows connection by the same connection method of image data transmitters (controllers) and image data receivers (printers) of different types. In the embodiment described above, since the image data transmission is performed in accordance with a predetermined control sequence using a serial bit signal, high-quality image data communication can be performed with a simple configuration and control sequence. Furthermore, since the above embodiment uses a separate transmission line for image data, high-speed image data transmission can be performed.

In the embodiment described above, the image data transmitter was an image reader and the image data receiver was an image recorder. However, the present invention is not limited to this. For example, the image data transmitter can be various types of input devices such as a pattern reader or an image data storage device, e.g., a word processor, a computer, or a magnetic disc. The image data receiver can be various types of input devices such as printers, e.g., an ink jet printer or electronic storage devices, e.g., a CRT display or a floppy disc. The system of the present invention can be applied to image data communication between such input and output devices. In the embodiment described above, the status/command signal is a serial 8-bit signal. However, the present invention is not limited to this. The status/command signal can have a different bit configuration. According to the present invention, the control data and the like are coded and the coded data are transmitted. Therefore, the configuration of the transmission line, connector and the like can be simplified to allow standardization of connection between the input and output devices.

Since the control/response data is coded in accordance with the present invention, connection of various types of devices can be performed if the codes are standardized.

For example, when a thermal transfer-type recording apparatus is used in place of a recording apparatus which uses a laser, as shown in FIG. 3, as an image recording apparatus, easy connection with the image transmitter can be performed by simply adding some other types of command and status shown in Tables 3 and 4. In this case, the command error status and the like shown in Table 4(A) can be commonly used. Of the signal lines shown in FIG. 4, those which are not required are not used.

As has been described above, according to the present invention, control data for controlling image output and response data responding to such control data are transmitted/received in accordance with a predetermined control sequence by means of a serial signal having a predetermined bit configuration. Accordingly, the present invention provides a general-purpose image data communication control system which allows connection of various types of devices by the same connection method.

The present invention is not limited to the particular embodiment described above, and various changes and modifications may be made within the spirit and scope of the present invention.

What I claim is:

1. An image forming apparatus, comprising:
   input means for inputting image data;
   image forming means for forming an image on a recording medium in accordance with the input image data;
   clock pulse input means for inputting first clock pulses from outside;
   clock pulse generating means for generating second clock pulses;
   clock pulse output means for outputting the second clock pulses to the outside; and
   status data output means for outputting to the outside status data of the image forming means;
   wherein said image forming apparatus outputs the status data to the outside in either a first or second mode, said first mode being one in which said apparatus outputs the status data in synchronism with the first clock pulses input form the outside, and said second mode being one in which said apparatus outputs the second clock pulses generated by said generating means to the outside and outputs the status data in synchronism with the second clock pulses.

2. An apparatus according to claim 1, further comprising input means for inputting command data from the outside, wherein said status data output means outputs the status data corresponding to the input command data in the first mode or the second mode.

3. An apparatus according to claim 2, wherein said apparatus is capable of selecting the first mode or the second mode on a basis of the command data from the outside.

4. An apparatus according to claim 1, wherein the first clock pulses and the second clock pulses are communicated via a common line.

5. An apparatus according to claim 2, wherein the command data and the status data are communicated via a common line.

6. An apparatus according to claim 1, wherein when an error occurs during image forming operation by said image forming means, said status data output means outputs to the outside information associated with the error as the status data.

7. An apparatus according to claim 6, wherein said information associated with the error includes a number of pages of image data to be re-sent.

* * * * *

UNITED STATES PATENT AND TRADEMARK OFFICE
CERTIFICATE OF CORRECTION

PATENT NO. : 5,162,917

DATED : November 10, 1992

INVENTOR(S) : KIYOHISA SUGISHIMA

It is certified that error appears in the above-identified patent and that said Letters Patent is hereby corrected as shown below:

On title page,

IN [56] REFERENCES CITED

Under U.S. PATENT DOCUMENTS,
"4,671,294" should read --4,691,294--.

COLUMN 5

Line 65, "the VSYNC" should read --the vertical sync signal $\overline{VSYNC}$--.

COLUMN 6

Line 3, "signal e,ovs/VSREQ/," should read --signal $\overline{VSREQ}$,--.
Line 36, "$\overline{VSO}$" should read --$\overline{VDO}$--.
Line 58, "signal e,ovs/SC/" should read --signal $\overline{SC}$--.
Line 65, "e,ovs/SC/" should read --$\overline{SC}$--.
Line 68, "signal e,ovs/SC/" should read --signal $\overline{SC}$--.

COLUMN 7

Line 36, "block" should read --clock--.
Line 65, "printer 1" should read --printer 2--.

COLUMN 8

Line 26, "05," should read --505,--.
Line 28, "13," should read --513,--.
Line 31, "28" should read --528--.
Line 34, "signal $\overline{VSO}$" should read --signal $\overline{VDO}$--.

UNITED STATES PATENT AND TRADEMARK OFFICE
CERTIFICATE OF CORRECTION

PATENT NO. : 5,162,917
DATED      : November 10, 1992
INVENTOR(S) : KIYOHISA SUGISHIMA It is certified that error appears in the above-identified patent and that said Letters Patent is hereby corrected as shown below:

COLUMN 11

TABLE 4-continued, "user" should read --used--.

COLUMN 16

Line 51, "form" should read --from--.

Signed and Sealed this

Sixteenth Day of November, 1993

Attest:

BRUCE LEHMAN

Attesting Officer    Commissioner of Patents and Trademarks